United States Patent [19]

Nagao et al.

[11] Patent Number: 4,607,962
[45] Date of Patent: Aug. 26, 1986

[54] OBJECT TEMPERATURE CONTROL DEVICE

[75] Inventors: Toshiaki Nagao, Muko; Yasuyuki Sukimoto, Yahata, both of Japan

[73] Assignee: Omron Tateisi Electronics, Co., Kyoto, Japan

[21] Appl. No.: 758,852

[22] Filed: Jul. 26, 1985

Related U.S. Application Data

[63] Continuation of Ser. No. 497,199, May 23, 1983, abandoned.

[30] Foreign Application Priority Data

May 28, 1982 [JP]  Japan ................................ 57-91859

[51] Int. Cl.[4] .................... F23N 5/02; G01K 7/00
[52] U.S. Cl. .................... 374/103; 236/46 F; 364/557; 364/569; 374/170
[58] Field of Search .................... 374/170, 102, 103; 236/78 R, 46 F; 364/557, 569

[56] References Cited

U.S. PATENT DOCUMENTS

| | | | |
|---|---|---|---|
| 4,015,208 | 3/1977 | Hammer et al. | 377/52 |
| 4,068,138 | 1/1978 | Miyakawa et al. | 374/170 X |
| 4,161,880 | 7/1979 | Prosky | 364/557 X |
| 4,181,957 | 1/1980 | Pinckaers | 374/170 X |
| 4,218,916 | 8/1980 | Mutziger | 374/170 |
| 4,298,947 | 11/1981 | Tamura et al. | 374/170 |
| 4,337,821 | 7/1982 | Saito | 236/91 G X |
| 4,432,210 | 2/1984 | Saito | 364/557 X |
| 4,447,884 | 5/1984 | Wada | 364/557 |

*Primary Examiner*—Daniel M. Yasich
*Attorney, Agent, or Firm*—Wegner & Bretschneider

[57] ABSTRACT

An improved temperature control device which is arranged to generate comparative output ratio signals linearly varying successively from a small value to a large value in a manner as in time series in correspondence to sampling period, at each proportional period including several periods of the sampling period, and also to successively compare the output ratio and the comparative output ratio at each of the sampling period, thereby to turn on an output control section at a subsequent sampling period when the sampling output ratio is larger than the comparative output ratio.

5 Claims, 17 Drawing Figures

PRIOR ART

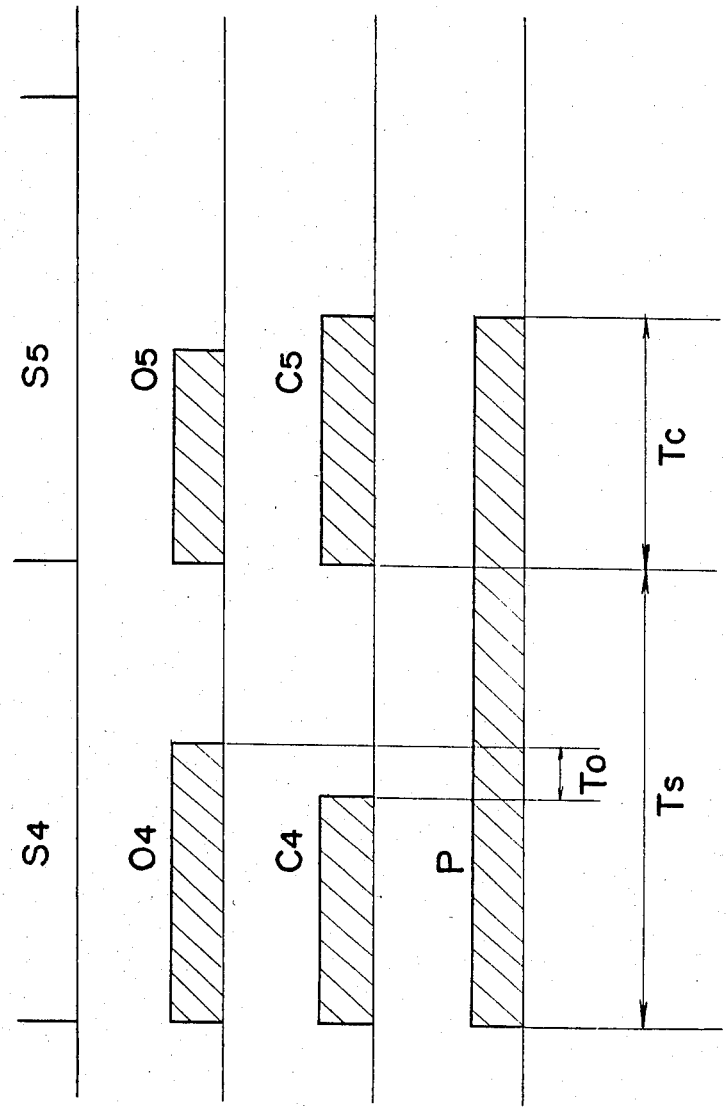

OBJECT TEMPERATURE CONTROL DEVICE

This application is a file-wrapper continuation application of U.S. application Ser. No. 497,199 filed May 23, 1983 now abandoned.

BACKGROUND OF THE INVENTION

The present invention generally relates to a temperature controller and more particularly, to a temperature control device arranged to control temperature of an object to be controlled through variation of on/off ratio for control output of an output control section, i.e. output ratio.

Conventionally, there has been proposed a temperature control device for controlling temperature of an object to be controlled, which is so arranged that, based on the temperature of the object to be detected and a target value to be set, predetermined calculations are effected by an operation or calculation unit at each sampling period so as to vary the on/off output ratio of an output control section according to the result of the above calculations for applying the output control amount thereof to the object to be controlled, thereby to control the temperature of said control object. In the known temperature control device of the above described type, when a relay or the like which is required to be relatively low in the number or frequency for opening and closing is employed for the output control section, it has been a common practice, as shown in FIGS. 1(a) to 1(d) that, with respect to sampling periods comparatively small in length (i.e. S1, S2, ..., and S16 in FIG. 1(a)), on/off control is effected by proportional periods each having a length several times that of the sampling period (i.e. T1, T2, ... and so forth in FIG. 1(c)). More specifically, the calculation of output ratio at the operation unit is effected per sampling period so as to obtain the output ratio at each time (O1, O2, ..., and O16 in FIG. 1(b)), and the output ratio at each of the sampling periods is summed up during the proportional period (for example, addition for O1+O2+ ... O8 is effected during the proportional period T1) so that the relay is energized or turned on in the subsequent proportional period (e.g. the proportional period T2) by an period equivalent to the added ratio (FIG. 1(d)). In the case where the frequency or number of opening and closing is required to be reduced as in the relay and the like, it may be unavoidable to effect the open/close function at a proportional period several times longer than that of the sampling period, if the sampling period is small, but in such a case, the functioning of the relay or the like corresponding to the temperature variation is inevitably delayed by one proportional period, thus being unable to keep up with the temperature variation when a load response speed of the object to be controlled is high, and consequently, stable control can not be effected as intended.

SUMMARY OF THE INVENTION

Accordingly, an essential object of the present invention is to provide an improved temperature control device which has a favorable response with respect to the temperature variations, without necessity for raising the frequency of opening and closing at the output control section, with substantial elimination of disadvantages inherent in the conventional temperature control devices of this kind.

Another important object of the present invention is to provide a temperature control device of the above described type, which is simple in construction and accurate in functioning at high reliability, and can be readily manufactured at low cost.

In accomplishing these and other objects, according to one preferred embodiment of the present invention, there is provided a temperature control device including means for detecting temperature of an object to be controlled, a target value setting means, an operation unit for effecting predetermined calculation at each sampling period based on the detected temperature from said temperature detecting means and the target value from said target value setting means so as to compute on/off output ratio, and an output control section for producing corresponding control amount based on result of the calculation by said operation unit, and characterized in that there are further provided means for generating comparative output ratio signals linearly varying successively from a small value to a large value in a manner as in time series in correspondence to said sampling period, at each proportional period including several periods of said sampling period, and means for successively comparing said output ratio and said comparative output ratio at each of said sampling period, thereby to turn on said output control section at a subsequent sampling period when said sampling output ratio is larger than said comparative output ratio.

By the arrangement of the present invention as described above, an improved temperature control device quick in response and accurate in functionings has been advantageously presented through simple construction and at low cost.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 1(a) to 1(d) are time charts explanatory of principle of functionings of a conventional temperature control device (already referred to), FIGS. 2(a) to 2(e) are time charts explanatory of principle of functionings of a temperature control device according to the present invention.

DETAILED DESCRIPTION OF THE INVENTION

Figure 3:
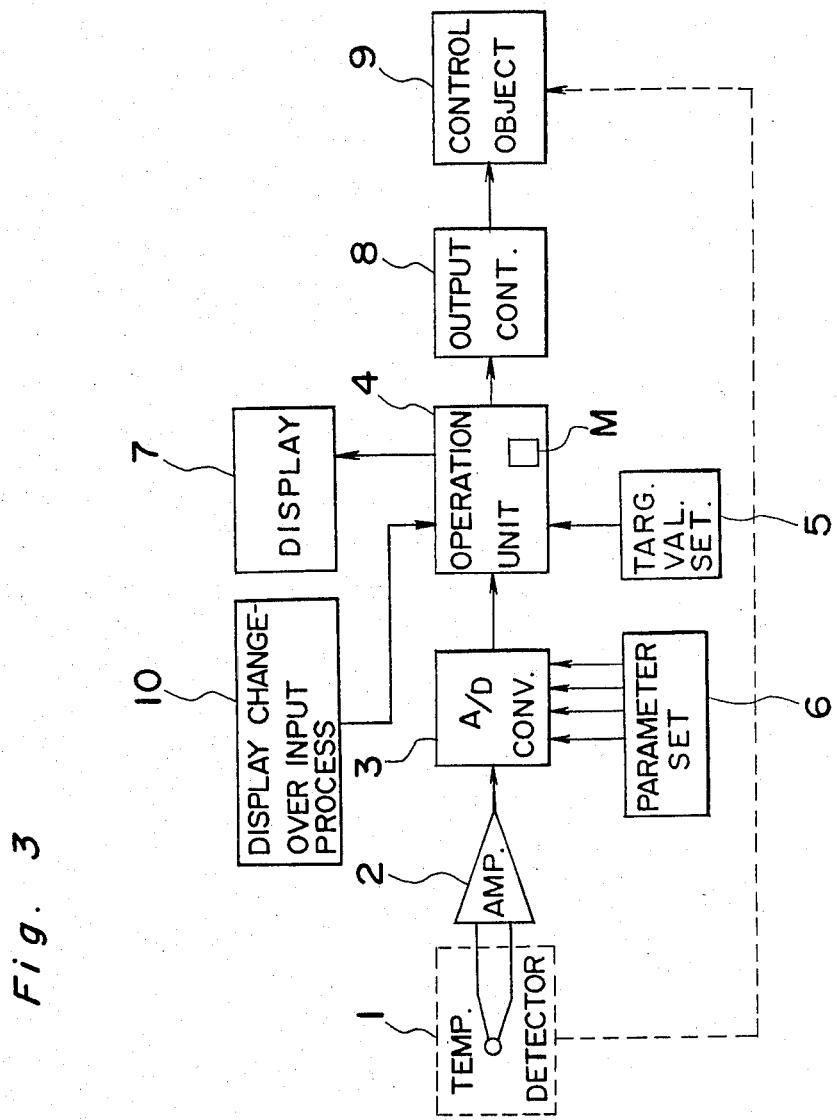
FIG. 3 is a block diagram showing a general construction of a temperature control device according to one preferred embodiment of the present invention.

Before the description of the present invention proceeds, it is to be noted that like parts are designated by like reference numerals throughout the accompanying drawings.

Referring now to the drawings, the principle of the temperature control device according to the present invention will be described hereinbelow with reference to the time charts shown in FIGS. 2(a) to 2(e).

In FIG. 1(a) there is shown a time line broken into sample periods $S_1, S_2, \ldots S_{16}$. In each one of these sample periods, the temperature of the object is measured and a ratio is determined between the measured object temperature, and the target value for the object measured. This ratio is called the output ratio and is shown in FIG. 1(b). The magnitude of the output ratio varies in accordance with the deviation of the object temperature from the target value or target set value. In FIG. 1(c) there are shown two proportional periods, $T_1$ and $T_2$. The reason these proportional periods are chosen at eight sample periods is because of the frequency response of the relay to which it may be attached. If the relay has a slow response time, it cannot turn on and off within the time of each sample period $S_1, S_2, \ldots S_{16}$. Therefore, in this known system, all of the output ratios $O_1$ through $O_8$ are summed, and this summation occurs at the end of the first proportional period $T_1$ (FIG. 1(c)). Once the summation is determined, the output is turned on for a time proportional to the sum of the output ratios. This turn on time is indicated in FIG. 1(d), and necessarily occurs in the proportional period after $T_1$. As pointed out in the specification, the problem with the prior device is that there is a long time delay between the measurements taken during proportional period $T_1$ (FIG. 1(c)), and the output which necessarily occurs during proportional period $T_2$, as shown in FIG. 1(c).

The applicants' improvement over the prior art is that the output can be adjusted in time periods which are less than the proportional period. I.e., this means that in the improvement, the output is adjusted within the proportional period $T_1$, rather than waiting for the next subsequent proportional period $T_2$. As can be seen in FIG. 1(d), the on period occurring in $T_2$ is after the measurements are made in time $T_1$, and this is not desired because of the long time period required before an output is provided which adjusts the temperature of the object being controlled.

The difference between the prior device described in FIG. 1 and the invention which is the subject of this application can now be seen when FIG. 2 is understood. In FIG. 2, there is shown in FIG. 2 (a) the same sample periods as were depicted in FIG. 1(a). Similarly, in FIG. 2 (b), the output ratios are shown which are precisely the same as those shown in FIG. 1 (b). Still further, the proportional period as set forth in FIG. 2(c) is the same as the proportional period set forth in FIG. 1(c). The difference in result achieved by this invention is seen by comparison of FIG. 2(e) with FIG. 1(d). In FIG. 2(e), in sample period $S_5$, the output in FIG. 2(e) is turned on for one sample period when the output ratio $O_4$ (FIG. 2(b)) is greater than the comparative output ratio $C_4$ as set forth in 2(d). By this method, whenever the measured output ratio which is shown in FIG. 2(b) exceeds the comparative output ratio 2(d), the output of the device is turned on as shown in FIG. 2(e). The only other difference between the method of operation set forth in FIG. 1 and that of FIG. 2 is the calculation of the comparative output ratio. As can be seen in FIG. 2(d), the comparative output ratio is calculated during each proportional period, and increases in value from the first sample period up to the eight sample period. Therefore, since the output is obtained following each sample period $S_1 \ldots S_8$, the response time is much faster than is available when the response time can only occur after a proportional period $T_1$ which is equal to eight sample periods.

FIG. 2(a) shows sampling periods $S1, S2, \ldots,$ and S16, and FIG. 2(b) represent examples of calculation output ratios corresponding to the respective sampling periods $S1, S2, \ldots,$ and S16, while FIG. 2(c) denotes proportional periods $T1, T2, \ldots$ and so forth, each produced once per eight sampling cycles, and such sampling periods, calculation output ratios, and proportional periods are generally similar to those in the time-charts of FIGS. 1(a) to 1(c) described earlier with reference to the conventional temperature control device. In FIG. 2(d) showing comparative output ratios $C1, C2, \ldots,$ and C8, it is seen that, as the sampling periods proceed in the manner as $S1, S2, \ldots,$ and S8 successively with time, corresponding comparative output ratios gradually increase linearly from the small value C1 to the large value C8, and the above comparative output ratios from C1 to C8 are repeated at each proportional period.

The control output at the output control section may be calculated through comparison between the output ratios $O1, O2, \ldots,$ and O8 shown in FIG. 2(b) and the comparative output ratios $C1, C2, \ldots,$ and C8 shown in FIG. 2(d), at each of the sampling periods $S1, S2, \ldots,$ and S16.

As a result of the above comparison, in the case where the output ratios are large with respect to the comparative output ratios $C1, C2, \ldots,$ and C8, the control output may be obtained in the following sampling periods. In the example as illustrated, at the sampling period S1, since the function is started, the control output P as shown in FIG. 2(e) is turned on, and owing to the relation O1 > C1, the control output P is turned on at the next sampling period S2. Similarly, based on the relation O2 > C2, the control output P is also turned on at the subsequent sampling period S3. However, since the relation is O3 < C3, the control output P is turned off at the next sampling period S4.

As is seen from the above description, in the temperature control device according to the present invention, the output ratios $O1, O2 \ldots,$ and O8 are successively compared with the comparative output ratios $C1, C2, \ldots,$ and C8 at each sampling period so as to turn on or off the control output based on the result of above comparison.

Figure 4:
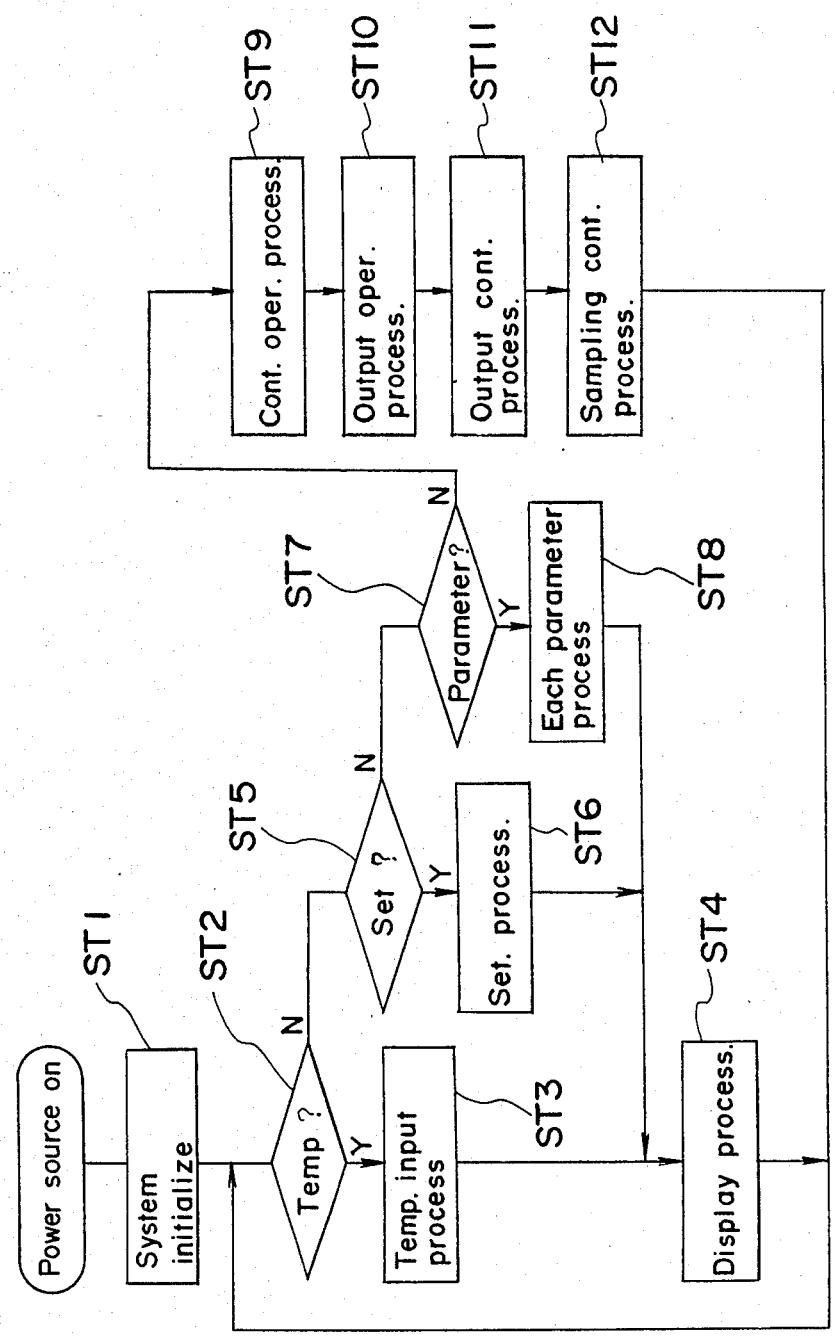
FIG. 4 is a flow-chart showing a normal processing flow for the temperature control device of FIG. 3.
Figure 5:
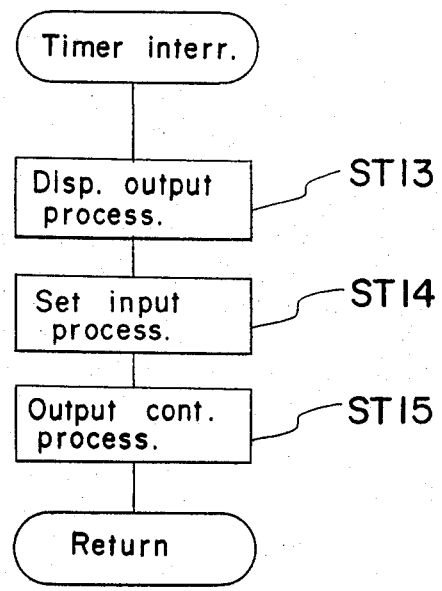
FIG. 5 is a flow-chart showing a timer interruption flow for the temperature control device of FIG. 3.

Referring also to FIGS. 3 to 5, the temperature control device according to the present invention will further be explained in detail hereinbelow.

In FIG. 3, there is shown a block diagram of the temperature control device for effecting the present invention, which includes a temperature sensor or detector 1 coupled to an operation or calculation unit 4 (micro-processor) having a memory means M, through an amplifier 2 and an A/D converter 3, with the operation unit 4 being further coupled to an object 9 to be controlled through an output control section 8, a parameter setting unit 6 connected to the A/D converter 3, and a display change-over input processing section 10, a target value setting unit 5, and a display unit 7 further coupled with the operation unit 4. For the temperature detector 1 to sense or detect the temperature of the object 9 to be controlled at all times as shown by the dotted line in FIG. 3, there may be employed, for example, a thermo-couple or thermo-electric thermometer, thermistor thermometer, etc. The amplifier 2 is intended to amplify analog signal corresponding to the temperature as detected by the temperature detector 1 up to a specified level, and the analog signal amplified by the amplifier 2 is converted into digital amount by the A/D converter 3 so as to be taken into the operation unit 4. The target value is set by the target value setting unit 5 in the form of digital value, while parameters such as P.I.D. proportional, integral and differential constant, etc. are similarly set by the parameter setting unit 6 in the analog form, these being taken into the operation unit 4 through the A/D converter 3. The operation unit 4 is arranged to effect predetermined calculations based on the detected temperature, target value, P.I.D. constant, etc. to produce output control amount through the output control section 8 for maintaining the object 9 in a controlled state. The output control section 8 is formed, for example, by a relay which is turned on or off based on the output ratio calculated and output by the operation unit 4, while the object 9 is constituted, for example, by a heating unit (or cooling unit) or the like for repeating heating and heat radiation according to the on/off function of the above relay. Meanwhile, the display unit 7 for indicating respective data normally displays the detected temperature. The display change-over input processing section 10 is arranged to successively display, in a stepwise advancing manner, the target value or parameter value on the display unit 7 normally displaying the detected temperature, each time a switch (not particularly shown) provided in the processing section 10 is operated.

General functionings of the temperature control device of FIG. 3 having the construction as described so far will be explained hereinbelow based on the normal processing flow-chart in FIG. 4 and the timer interruption flow-chart in FIG. 5.

It should be noted here that the processings as shown in FIGS. 4 and 5 are effected through control by the operation unit 4 referred to earlier.

In the first place, upon turning on of a power source by a main switch (not shown), a so-called initializing processing such as clearing of each register in the operation unit 4 to zero, etc. is effected at a step ST1, and a temperature input processing, i.e. taking the temperature value as detected by the temperature detector 1 into the operation unit 4, is first effected at steps ST2 and ST3. Subsequently, processing is transferred to setting of the target value after carrying out display processing of the temperature value at a step ST4 for taking the target value set by the setting unit 5 into the operation unit 4 at steps ST5 and ST6. Moreover, the various parameters set by the setting unit 6 are also successively taken into the operation unit 4 at steps ST7 and ST8. After taking-in of the data from the step ST2 to step ST8 has been effected, control operation processing (step ST9), output operation processing (step ST10), output control processing (step ST11), and sampling control processing (step ST12) are carried out, with the cycle processings from the step ST2 to step ST12 being repeated per each sampling time.

As shown in FIG. 4, the arrow from ST4 back to the input of decisional block ST2 provides for recirculation after the decision is made. In this manner, when the first decision is made at ST2 and temperature is found to be inputted at ST3, the system then recycles to again test for temperature at ST3. In the next cycle, there will be no temperature and thus decisional block ST2 will respond as "N" and provide an input to decisional block ST5. ST5 then determines if the target value has been set and provides for recycling back to ST4 and to the input to ST2. The cycle then repeats again where ST2 provides an N output and ST5 provides an N output. When decisional block ST7 receives the negative input, it decides if a parameter exists. Again, the process recycles back to ST2. Finally, when ST7 provides an N output, the final step of the process from ST9 through ST12 is completed.

Meanwhile, the temperature control device according to the present invention is also so arranged that the timer interruption as shown in FIG. 5 may be applied thereto at a much more shorter time cycle than in the sampling time as described above for effecting display output processing (step ST13), set input processing (step ST14), and output control processing (step ST15) respectively, depending on necessity.

Subsequently, details of the output control processing function directly related to the present invention in the general ordinary processing flow as described so far, will be explained with reference to the processing flow-chart shown in FIG. 6.

In the similar manner as described so far (steps ST1 to ST9 in FIG. 4), the initializing processing is first effected in the sampling period after turning on of the power source, and is followed by subsequent temperature input processing, target value setting processing, parameter processing, and control calculation processing, etc.

Upon entry into the output calculation processing subsequent to the above processings, sampling output ratio is calculated and established (step ST101), based on the control calculation processing at the step ST9. Thereafter, successive comparative output ratio is established (step ST102) at the sampling period therefor, and then, the sampling output ratio is compared with the successive comparative output ratio (step ST103). For instance, if the sampling period S4 of the time-chart shown in FIG. 2(a) is taken as an example, O4 is established as the sampling output ratio, while C4 is established as the successive comparative output ratio, for comparison between the both output ratios O4 and C4.

Upon comparison, in the case where the sampling output ratio is small (step ST104 judgement YES) as compared with the successive comparative output ratio, turning off of the control output in the next sampling period is determined (step ST115), while on the contrary, if the sampling output ratio is larger (step ST104 judgement NO), turning on of the control output at the next sampling period is determined (step ST111). In the case where turning off of the output is determined at a step ST115, functioning is shifted to that of the next sampling period through a sampling period control at the step ST12, i.e. time counting of the predetermined sampling period.

For even more precise control, the timing shown in FIG. 7 may be used. FIG. 7 shows timing occurring during sample periods $S_4$ and $S_5$ of FIG. 2. In the example of FIG. 7, it is possible to turn the output off within the interval of one timing sample period ($S_5$). In FIG. 5, there is shown first an output ratio $O_4$ (FIG. 7(b)), and a comparative ratio $C_4$ (FIG. 7(c)). $T_0$ is calculated as the difference between $O_4$ and $C_4$. Then, in accordance with the formula on page 12, The quantity $T_c$ is calculated by multiplying the term $T_0$ times the proportional period $(8 \times T_s) \div T_s$. In this example, if $T_c$ is greater than $S_5$, the output will remain on throughout the entire period $S_5$. However, when the difference time $T_c$ is calculated and becomes less than $S_5$, the output will remain on only during the time $T_c$ within the sample period $S_5$. In this manner, output is limited to less than a sample period when the output ratios $O_4$ and $C_4$ are sufficiently close as to provide a very small quantity $T_0$. Therefore, from reference to FIGS. 1, 2, and 7, it can be seen that this invention first provides control within a proportional period (FIG. 2(c)), and even further provides control within a sample period (FIG. 7(d)) when the output ratios are very close together.

When turning on of the output is determined at a step ST111, difference between the sampling output ratio and the successive comparative output ratio is subsequently calculated (step ST112). Although the above difference may be directly represented by $O_i - C_i = T_0$ as shown in FIG. 7, this is converted into time $T_c$ with respect to the proportional period T by the ratio of $T_0$ with respect to the sampling period $T_s$. In other words, the difference time $T_c$ as converted may be represented by $$T_c = T_0(T/T_s)$$

Subsequently, the difference time $T_c$ is compared with the sampling period $T_s$ (step ST113), and if the difference time $T_c$ is larger than the sampling period $T_s$, function is transferred to that of the next sampling period through the sampling period control at the step ST12. In the above case, in the next sampling period, control output is to be turned on throughout the whole period. On the contrary, if the difference time $T_c$ is found to be smaller than the sampling period $T_s$ as a result of the comparison at the step ST113, the difference time $T_c$ is set in a separately provided counter so as to effect control of the control output by said counter (step ST114), and thus, during the next sampling period, the control output is turned on by the time period $T_c$ shorter than the sampling period $T_s$. The counter employed in the above case is controlled by the timer interruption, with the resolving power thereof being determined by the synchronization of the timer interruption. Needless to say, the counter as described above is provided in the memory section M incorporated in the operation unit 4.

EXAMPLE OF OPERATION OF UNIT 4

Figure 6:
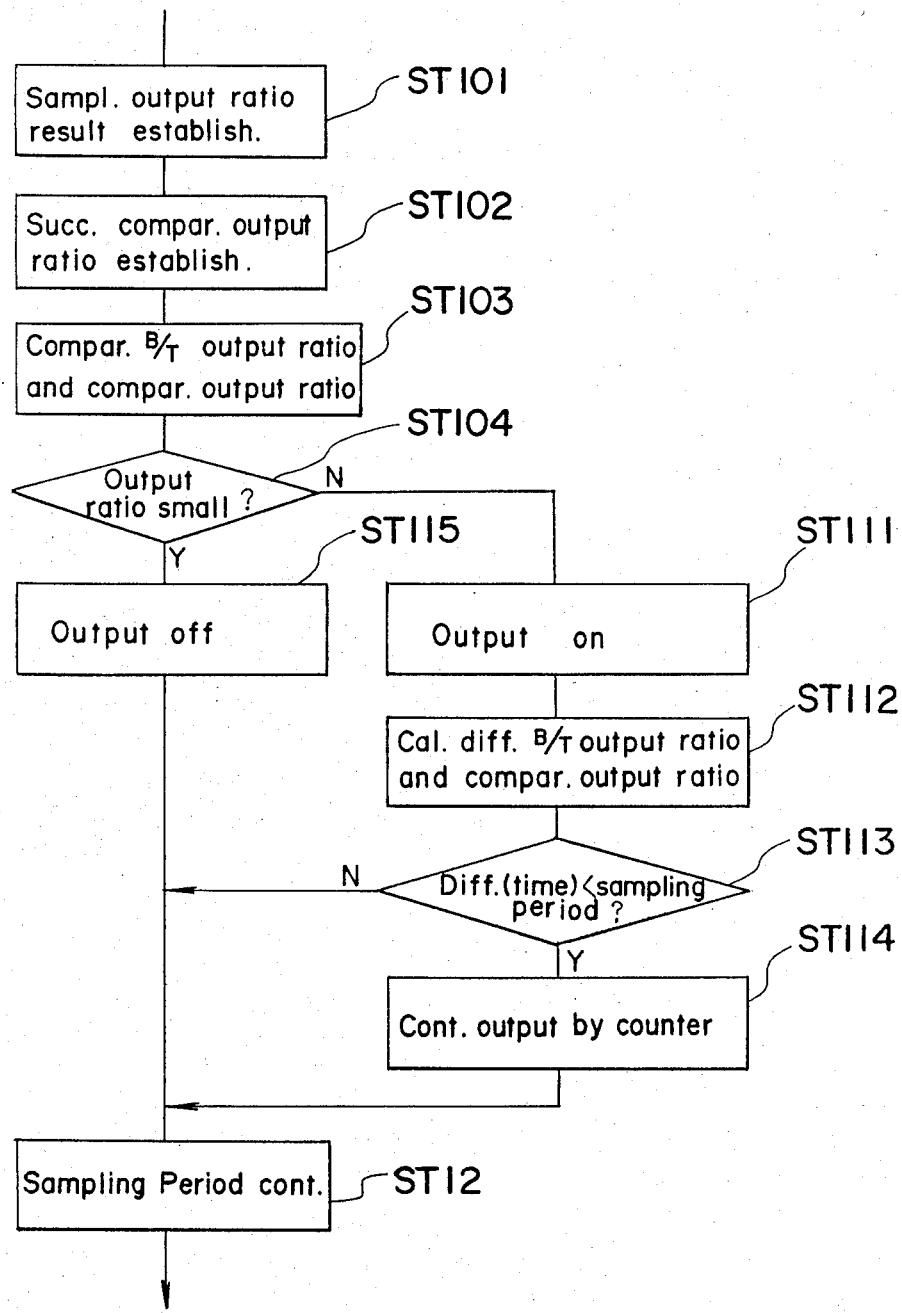
FIG. 6 is a flow-chart illustrating in detail, output calculation processing routine and output control processing routine as related to the present invention, and FIGS. 7(a) to 7 (d) are diagrams illustrating, on an enlarged scale, sampling periods in the timing chart of FIG. 2 for reference to the explanation by the flow chart of FIG. 6.

The operation of unit 4 is fully set forth in the decisional diagrams (logic flow) of FIGS. 4, 5, and 6. The operation of FIGS. 5 and 6 is as follows. The step of comparing sample output ratio results with comparative output ratio results is found in ST101 and ST102 as depicted in FIG. 6. The comparison at step ST103 produces either a negative or positive amount which indicates whether the comparative output ratio is greater than or smaller than the sample output ratio. When the comparative output ratio is small, the output is turned off, as shown in FIG. 6. This means that when the sample (line 2(b)) is greater than the comparative output value (line 2(d)), the decision is "no", and the output is turned on. Similarly, when the decision is "yes" (i.e., 2(e) is greater than 2(b)), the output will be turned off.

Sample calculations are provided hereinbelow based upon the data set forth in FIG. 2 and FIG. 7. In FIG. 7, a measurement of the time period $S_4$ in centimeters is 7.8 cm. Similarly, the measurement of time period $O_4$ is 4.6 cm, and the measurement of time period $O_5$ is 3.5 cm. Based upon the scaled magnitudes of the measured quantities $O_4$ and $O_5$, the complete calculations demonstrating the operation of this invention may be obtained as follows.

Assume $T_s = 2$ seconds where $T_s$ is time for $S_4$, $S_5$, etc. Then $$O_4 = \frac{4.6 \text{ cm}}{7.8 \text{ cm}} \cdot 2 \text{ sec} = 1.18$$

$$O_5 = \frac{3.5 \text{ cm}}{7.8 \text{ cm}} \cdot 2 \text{ sec} = .90 \text{ sec}$$

The calculation of $C_4$ and $C_5$ is as follows:

$$C_n = T_s \cdot \frac{n}{N_s}$$

$$C_4 = 2 \text{ sec} \cdot \frac{4}{8} = 1 \text{ sec}$$

$$C_5 = 2 \text{ sec} \cdot \frac{5}{8} = 1.25 \text{ sec}$$

This relationship is shown on FIG. 2(d) and also in FIG. 7(c). The comparative output ratio $C_n$ is equal to the sample period time $T_s$ times the nth sample period divided by the number of sample periods $N_s$ in each proportional period. The comparative output ratio may also be calculated by another equation which will provide a useful relationship for use with this invention.

The next calculation is of $T_0$ as shown in FIG. 7.

$$T_{04} = O_4 - C_4$$
$$= 1.18 \text{ sec.} - 1 \text{ sec} = +.18$$
$$T_{05} = O_5 - C_5$$
$$= .90 \text{ sec} - 1.25 \text{ sec} = -.35 \text{ sec}$$

Therefore, as shown in block diagram 6, decision block ST104 gives a N output for $T_4$ and a y output for $T_5$.

As explained in the specification, page 12, when $$T_c = T_0 \cdot (T/T_s) < T_s$$

the output of the next sample period will be $T_c$ seconds long instead of $T_s$ when $T_c > T_s$. It is by this additional calculation that the control within a sample period time ($T_s$) is achieved.

In the above arrangement according to the present invention, it is for effecting a still more precise fine control that the control output in the subsequent sampling period is arranged to be turned on in correspondence to the difference between the output ratio and the successive comparative output ratio, even when the control output is turned on as a result of comparison therebetween in each sampling period.

As is clear from the foregoing description, according to the temperature control device of the present invention, it is so arranged that, during the proportional period including several periods of the sampling period, the comparative output ratio signals linearly varying successively from the small value to the large value in time series in correspondence to the sampling period, are produced for successive comparison between the output ratio and the comparative output ratio calculated at each sampling period for selective turning on or off of the control output of the output control section, and therefore, it is possible to effect proper control for each sampling period, even when the proportional period is increased to any extent, so as to obtain a quick output response, and thus, proper control may be effected by keeping up even with a sudden change in the state of the object to be controlled.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. In a temperature control device having means for detecting the temperature of an object whose temperature is to be controlled, a target temperature value setting means for setting a desired value of temperature for the object, an operation unit means for determining temperature sampling periods and for effecting a predetermined calculation of an on/off output ratio which is based upon the ratio of said detected object temperature to said target temperature value, and means for producing an output based upon said on/off output ratio, wherein said output is to control means to maintain the temperature of said object at substantially the set desired value, the improvement comprising:

means for generating comparative output ratio signals during each sampling period by said operative unit means, and means for periodically comparing said on/off output ratio to said comparative output ratio signals by said operative unit means, whereby said output for control of said temperature is turned on in the next subsequent sampling period when said output ratio is greater than said comparative output ratio.

2. A temperature control device as claimed in claim 1, wherein said temperature detecting means is a thermocouple thermometer.

3. A temperature control device as claimed in claim 1, wherein said temperature detecting means is a thermistor thermometer.

4. A temperature control device as claimed in claim 1, wherein said operation unit means is a micro-processor.

5. The temperature control device as claimed in claim 1 wherein said comparative output signal varies linearly from a small value to a larger value in a time series corresponding to a plurality of said sampling periods.

* * * * *